United States Patent
Rylander et al.

(10) Patent No.: US 6,848,377 B2
(45) Date of Patent: Feb. 1, 2005

(54) FURROW OPENER/CLOSER IN AN AGRICULTURAL MACHINE

(75) Inventors: David J. Rylander, Victoria, IL (US); Miles R. Keaton, Rock Island, IL (US); William H. Thompson, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/339,981

(22) Filed: Jan. 10, 2003

(65) Prior Publication Data

US 2004/0134398 A1 Jul. 15, 2004

(51) Int. Cl.[7] ............................................. A01C 5/00
(52) U.S. Cl. .................................... 111/195; 172/538
(58) Field of Search ............................ 111/190, 191, 111/192, 193, 194, 195; 172/538, 701

(56) References Cited

U.S. PATENT DOCUMENTS

| | | | | |
|---|---|---|---|---|
| 345,403 A | * | 7/1886 | Arnett | 172/490 |
| 2,577,775 A | * | 12/1951 | Lemmon et al. | 111/195 |
| 2,656,801 A | * | 10/1953 | Hansen et al. | 111/59 |
| 2,691,353 A | * | 10/1954 | Secondo | 111/14 |
| 4,009,668 A | * | 3/1977 | Brass et al. | 111/137 |
| 4,273,057 A | * | 6/1981 | Pollard | 111/164 |
| 4,275,670 A | * | 6/1981 | Dreyer | 111/195 |
| 4,519,325 A | * | 5/1985 | Miller | 111/164 |
| 4,712,492 A | * | 12/1987 | Murray | 111/136 |
| 5,427,038 A | * | 6/1995 | Ege | 111/137 |
| 5,645,000 A | * | 7/1997 | Carroll | 111/195 |
| 5,906,166 A | * | 5/1999 | Wagner | 111/170 |
| 6,347,594 B1 | | 2/2002 | Wendling et al. | 111/167 |
| 6,578,502 B1 | * | 6/2003 | Barnstable et al. | 111/164 |

OTHER PUBLICATIONS

Fundamentals of Machine Operation, Deere & Company, 1981.

* cited by examiner

Primary Examiner—Victor Baston
(74) Attorney, Agent, or Firm—Taylor & Aust, P.C.

(57) ABSTRACT

An assembly for opening and closing a furrow in soil includes a furrow opener with a pair of discs positioned at an angle relative to each other. The discs each have an inner side facing toward each other and an outer side facing away from each other. Each disc also has a leading edge and a trailing edge relative to a travel direction. A furrow closer includes a pair of wheels, each having an inner side facing toward each other and positioned adjacent to a corresponding disc outer side. Each wheel also has a leading edge positioned between a corresponding disc leading edge and disc trailing edge, and a trailing edge positioned rearward of a corresponding disc trailing edge relative to the travel direction.

17 Claims, 3 Drawing Sheets

FURROW OPENER/CLOSER IN AN AGRICULTURAL MACHINE

FIELD OF THE INVENTION

The present invention relates to agricultural machines, and, more particularly, to furrow openers and losers.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper, insecticide hopper, furrow opener/closer, etc.

One type of opener closer arrangement uses a depth gauge wheel which is placed adjacent to the leading edge of a single disc opener assembly including a seed tube on the trailing side of the disc. The wheel provides depth adjustment, cleans the leading face of the disc, and limits soil lifting and throw adjacent the disc. One or more closing wheels trail the disc to move soil and close the furrow over the material deposited from the seed tube. Such openers limit soil disturbance, but often a portion of the seed boot or runner operates soil just outside the seed trench which increases soil disturbance, power requirements, wear and seed placement inconsistencies. The leading side wheel axis is close to the disc hub so the wheel operates forwardly of the area where the disc exits the soil so soil lift at the exit point can be a problem, particularly when the operating depth of the disc is increased. If the boot lies outside the furrow, tracking problems are also increased.

With a single disc opener arrangement of this type, the closing wheels trail the seed boot a substantial distance. The actual closing of the furrow occurs sometime after the deposited material reaches the bottom of the furrow, and the material has time to bounce from the bottom of the furrow and as a result the material is placed shallower than desired. At times, the deposited material can actually bounce completely out of the furrow and lie on top of the ground. Seeds which lie on top of the ground will not germinate. An opener arrangement of this type also has increased geometric space requirements since the gauge wheel, disc opener and closing wheels are sequentially arranged relative to the travel direction.

U.S. Pat. No. 6,347,594 (Wendling et al.), which is assigned to assignee of the present invention, discloses a furrow opener (FIGS. 1 and 5) having a single disc opener which forms a furrow in the soil. A depth gauge wheel is placed along the trailing edge of the single disc opener, and a further wheel is placed so as to generally overlie the seed furrow. The wheels are positioned at oblique axes relative to the seed trench. However, the wheels are not configured to pinch the furrow in from opposite sides, but rather are generally aligned with each other. That is, the pair of wheels are not quite parallel with each other but are generally aligned with each other.

The opener arrangement disclosed by Wendling et al. '594 is a step forward in the art. However, this opener arrangement is particularly adapted for a single disc opener.

What is needed in the art is a furrow opener/closer which effectively closes a trench formed with a double disc opener at higher ground speeds, with less soil compaction and minimum geometric space requirements.

SUMMARY OF THE INVENTION

The present invention provides a furrow opener/closer with a pair of gauge/closing wheels which are positioned rearward of and generally in line with a respective pair of opener discs.

The invention comprises, in one form thereof, an assembly for opening and closing a furrow in soil. A furrow opener includes a pair of discs positioned at an angle relative to each other. The discs each have an inner side facing toward each other and an outer side facing away from each other. Each disc also has a leading edge and a trailing edge relative to a travel direction. A furrow closer includes a pair of wheels, each having an inner side facing toward each other and positioned adjacent to a corresponding disc outer side. Each wheel also has a leading edge positioned between a corresponding disc leading edge and disc trailing edge, and a trailing edge positioned rearward of a corresponding disc trailing edge relative to the travel direction.

An advantage of the present invention is that the planter may be used at higher ground speeds with good spacing accuracy between seeds.

Another advantage is that the gauge/closing wheels of the present invention provide less soil compaction.

Yet another advantage is that the discs and gauge/closing wheels of the present invention are configured to coact in a manner providing effective trench opening and closing with minimum geometric space requirements.

A further advantage is that the gauge/closing wheels of the present invention provide improved closing of wet, moist or sticky soils.

A further advantage is that the wheels provide the dual functionality of both gauge wheels and closing wheels.

DETAILED DESCRIPTION OF THE INVENTION

Figure 1:
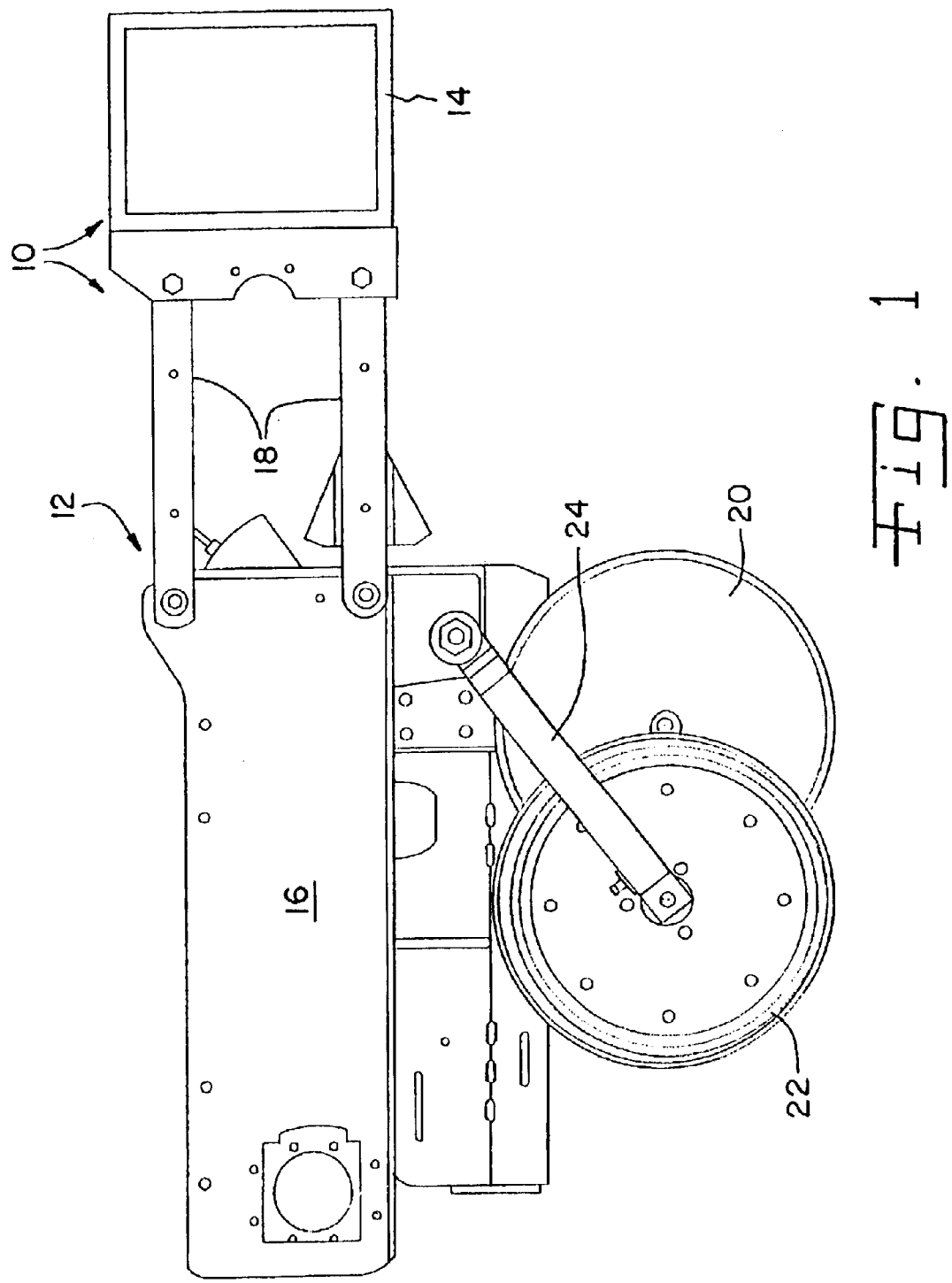
FIG. 1 is a side view of an embodiment of a seeding machine of the present invention including a row crop unit.
Figure 2:
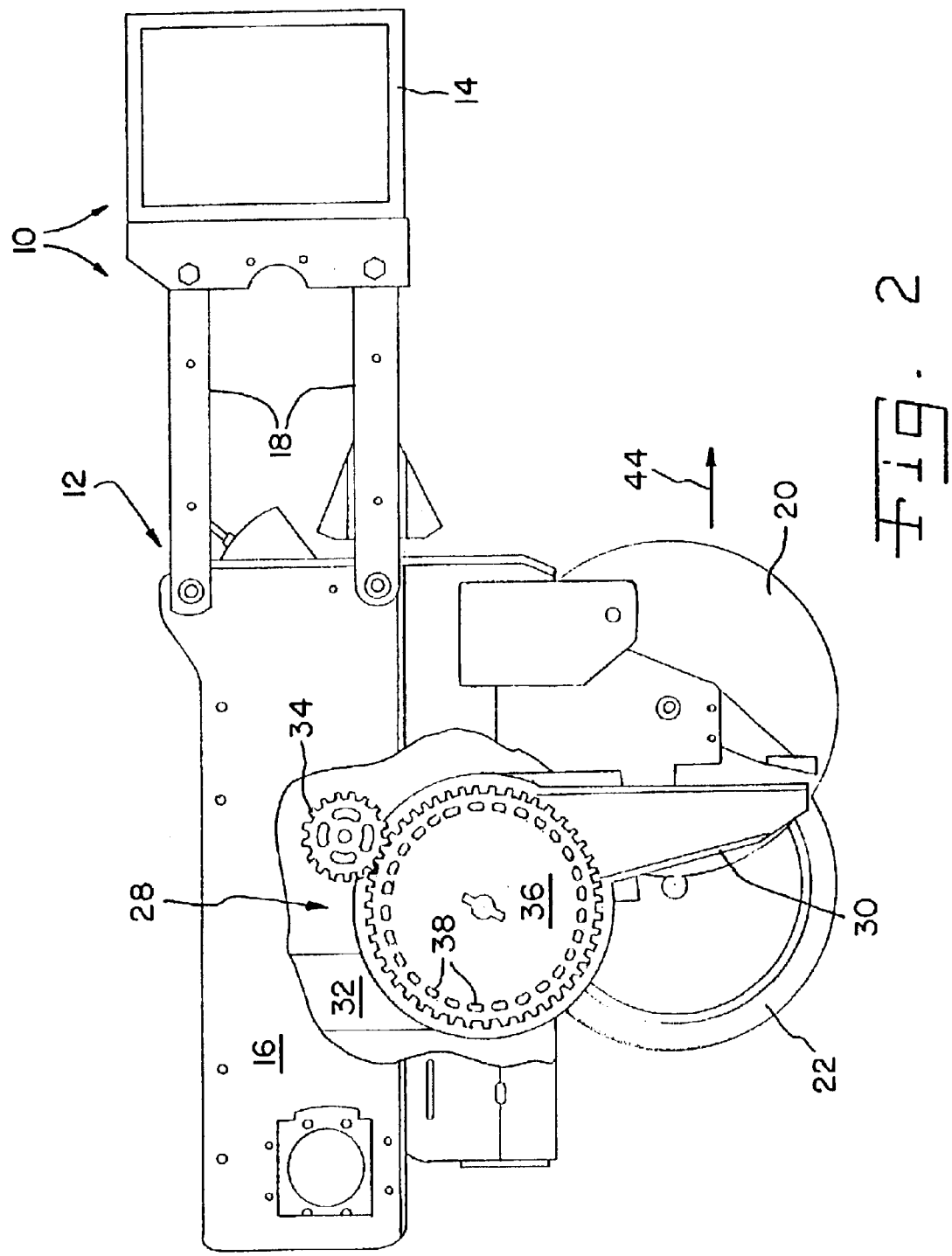
FIG. 2 is a partially fragmentary, side view of the row crop unit shown in FIG. 1.

Referring now to the drawings, and more particularly to FIGS. 1 and 2, there is shown an embodiment of a seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a double disc furrow opener 20 for forming a seed trench in soil. A pair of gauge/closing wheels 22, also known herein as press wheels 22, are respectively associated with the pair of discs of double disc furrow opener 20. More particularly, each gauge/closing wheel 22 is positioned generally in line with and immediately adjacent to the outside of each respective disc of double disc furrow opener 20. Gauge/closing wheels 22 are pivotally coupled with frame 16 by respective arms 24. Each gauge/closing wheel 26 may be vertically adjusted to adjust the depth of the trench which is cut into the soil using double disc furrow opener 20. Double disk furrow opener 20 and gauge/closing wheels 22 will be described in greater detail with respect to FIG. 3 below.

Referring now to FIG. 2, each row crop unit 12 of seeding machine 10 carries a seed metering system 28 and a seed tube 30. Seed metering system 28 includes an inlet chute 32 which receives seed from a main seed supply, such as a seed hopper carried above frame 16. Alternatively, seed may be stored in a distant main seed hopper and supplied to inlet chute 32 via air or the like.

Seed metering system 28 also includes a drive wheel 34 which drives a seed disc 36 having a plurality of seed cells 38 intermittently spaced about the periphery thereof. A vacuum source (not shown) applies vacuum pressure to seed cells 38 formed in seed disc 36. This vacuum pressure promotes entry of the seeds into seed cells 38 and maintains the seeds in place within seed cells 38. Seeds are transported from seed cells 38 to tube 30, dependent upon the particular seed population and spacing which is desired within a field.

Seed tube 30 directs seed at a predetermined rate and spacing into the seed trench formed by double disc furrow opener 20. Seed tube 30 has a width in a direction transverse to the seed trench which is less than the width of the seed trench, but may also be approximately equal to the width of the seed trench. Seed tube 30 is configured such that seed preferably falls into the seed trench without contacting seed tube 30, and also acts as a wind shield for the seed.

Figure 3:
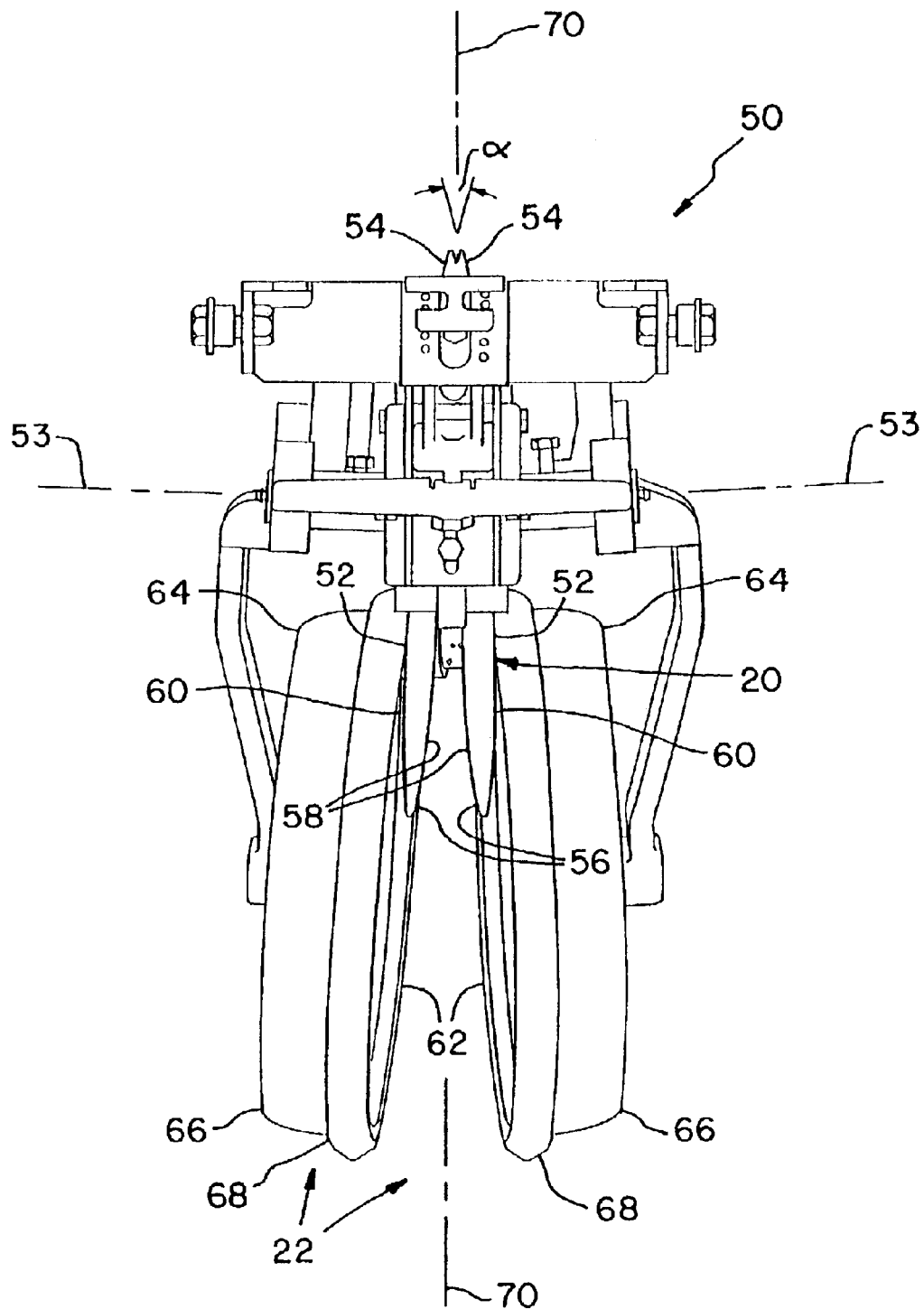
FIG. 3 is a top view of the furrow opener/closer shown in FIGS. 1 and 2.

Referring now to FIGS. 2 and 3, frame 16 carries a furrow opener/closer 50, including a double disc furrow opener 20 and gauge/closing wheels 22. Double disc furrow opener 20 includes a pair of discs 52 which are positioned at a predetermined acute angle ∀ (FIG. 3) relative to each other. Discs 52 are each rotatable about a corresponding axis of rotation 53, and have a leading edge 54 and trailing edge 56 relative to travel direction 44.

Each disc 52 also has an inner side 58 facing toward each other and an outer side 60 facing away from each other. Seed tube 30 defines a material placement device (e.g., for seed, fertilizer, etc.) which is positioned between inner sides 58 of discs 52.

The pair of gauge/closing wheels 22 provide the dual functionality of seed furrow depth adjustment and seed furrow closing. Each gauge/closing wheel 22 has an inner side 62 facing toward each other and positioned adjacent to an outer side 60 of a corresponding disc 52 (FIG. 3). Each gauge/closing wheel 22 has a leading edge 64 and a trailing edge 66 relative to travel direction 44. Leading edge 64 is positioned between an axis of rotation 53 and trailing edge 56 of a corresponding disc 52. Trailing edge 66 is positioned rearward of a trailing edge 56 of a corresponding disc 52 relative to travel direction 44.

Each gauge/closing wheel 22 also includes a peripheral rim 68 adjacent wheel inner side 62, and thus in turn adjacent to the seed furrow formed by discs 52. Peripheral rim 68 provides localized increased pressure to the soil adjacent the seed trench to collapse and cover the seed trench. The amount of down pressure which is applied to the soil adjacent to the seed furrow may be adjusted depending on the application. For example, it may be necessary in certain applications (e.g., no till planting conditions) to apply a pressing force of up to 300 pounds to the soil using gauge/closing wheels 22 in order to effect adequate covering of the seed furrow.

In the embodiment shown in FIG. 3, discs 52 and gauge/closing wheels 22 have an axis of symmetry 70 therebetween. In other words, discs 52 and gauge/closing wheels 22 are configured substantially identically on either side of the seed furrow. Of course, it is possible to form discs 52 and/or gauge/closing wheels 22 with different diameters and orientations relative to each other. For example, gauge/closing wheels 22 may have a diameter substantially larger than discs 52, with the leading edge of each gauge/closing wheel 22 being positioned forward of a corresponding disc leading edge, and the trailing edge of gauge/closing wheel 22 positioned rearward of a corresponding disc trailing edge.

In the embodiment shown, furrow opener/closer 50 is used in conjunction with an agricultural seeding machine in the form of a row crop planter. However, it is also to be understood that furrow opener/closer 50 may also be used for other agricultural applications, such as a fertilizer applicator, etc.

During use, a selected seed type is received from a main seed supply at inlet chute 32 of seed metering system 28. The seed is maintained against a side of seed disc 36, which is driven by drive wheel 34 at a selected rotational speed using a ground drive, hydraulic motor, electric motor or other suitable drive. Seeds are received within seed cells 38 of seed disc 36. To assist seed movement into seed cells 38, a vacuum pressure is applied to the opposite side of seed disc 36 using a suitable vacuum source. Of course, a positive pressure may also be applied to the side of seed disc 36 at which the seeds are disposed. The seeds are discharged from seed metering system 28 at a predetermined rate to seed tube 30. The seed is discharged from seed tube 30 into the seed furrow formed in the soil. The seed furrow is formed using discs 52 of double disc furrow opener 20. The depth and width of the furrow are controlled by raising and lowering gauge/closing wheels 22. Peripheral rim 68 of each gauge/closing wheel 22 collapses the soil adjacent to the seed furrow resulting in covering the seed furrow.

Furrow opener/closer 50 of the present invention may be used at higher ground speeds (e.g., 5–7 mph) with the same or improved spacing accuracy between seeds. As is apparent from FIG. 2, the seeds fall into the trench at a location immediately after opening of the trench with double disk furrow opener 20 and closing of the trench with gauge/closing wheels 22. Furrow opener/closer 50 does not attempt to match the forward velocity and trajectory of the seed with the forward velocity of the planter, but rather quickly closes the seed trench after seed drop to improve spacing accuracy. By placing gauge/closing wheels 22 slightly rearward from conventional placement, sidewall compaction of the seed trench is reduced since the soil is not pressed against the sides of discs 52. In contrast with a conventional row crop unit including a separate pair of closing wheels spaced rearwardly from the opener disk and gauge wheels, gauge/closing wheels 22 of the present invention are positioned and structured so as to close the trench immediately rearwardly of disk 52, thereby resulting in better closing of the trench when traveling on a curved travel path. Further, since a separate pair of closing wheels are not utilized rearward of furrow opener/closer 50, the geometric compactness of the row crop unit is improved. Additionally, by not compacting wet or moist soil against the sides of disk 52 and collapsing the sidewalls of the seed trench immediately after the point of maximum opening of the seed trench, improved closing of the seed trench occurs in wet, moist, sticky and other similar adverse soil conditions.

Having described the preferred embodiment, it will become apparent that various modifications can be made without departing from the scope of the invention as defined in the accompanying claims.

What is claimed is:

1. An agricultural machine, comprising:

a tool bar; and at least one furrow opener/closer carried by said tool bar for opening and closing a furrow in soil, each said opener/closer comprising:

a furrow opener including a pair of discs positioned at an angle relative to each other, said discs each having an inner side facing toward each other and an outer side facing away from each other, each said disc also having a trailing edge relative to a travel direction; and a furrow closer including a pair of press wheels, said wheels each having an inner side facing toward each other and positioned immediately adjacent to a corresponding said disc outer side, each said wheel also having a trailing edge positioned rearward of said corresponding disc trailing edge relative to the travel direction, each said disc having an axis of rotation, and each said wheel having a leading edge relative to the travel direction, each said wheel leading edge being positioned between a corresponding said axis of rotation and said disc trailing edge.

2. The agricultural machine of claim 1, wherein each said wheel includes a peripheral rim adjacent said wheel inner side.

3. The agricultural machine of claim 1, wherein said discs have an axis of symmetry therebetween.

4. The agricultural machine of claim 3, wherein each said wheel inner side and corresponding disc inner side are positioned at a common acute angle relative to said axis of symmetry.

5. The agricultural machine of claim 1, further including a material placement device positioned between said pair of discs.

6. The agricultural machine of claim 1, wherein each of said press wheels are positioned at an acute angle relative to each other, which is substantially parallel with said angle associated with said pair of discs.

7. The agricultural machine of claim 1, wherein said pair of press wheels each have a width by which a pressing force is applied to the soil.

8. An assembly for opening and closing a furrow in soil, comprising:

a furrow opener including a pair of discs positioned at an angle relative to each other, said discs each having an inner side facing toward each other and an outer side facing away from each other, each said disc also having a trailing edge relative to a travel direction; and a furrow closer including a pair of press wheels, said wheels each having an inner side facing toward each other and positioned immediately adjacent to a corresponding said disc outer side, each said wheel also having a trailing edge positioned rearward of said corresponding disc tailing edge relative to the travel direction each said disc having an axis of rotation, and each said wheel having a leading edge relative to the travel direction, each said wheel leading edge being positioned between a corresponding said axis of rotation and said disc trailing edge.

9. The assembly of claim 8, wherein said discs have an axis of symmetry therebetween.

10. The assembly of claim 9, wherein each said wheel inner side and corresponding disc inner side are positioned at a common acute angle relative to said axis of symmetry.

11. The assembly of claim 8, wherein said pair of press wheels each have a width by which a pressing force is applied to the soil.

12. The assembly of claim 8, wherein each of said press wheels are positioned at an acute angle relative to each other, which is substantially parallel with said angle associated with said pair of discs.

13. An assembly for opening and closing a furrow in soil, comprising:

a furrow opener including a pair of discs positioned at an acute angle relative to each other, said discs each having an inner side facing toward each other and an outer side facing away from each other, each said disc also having a leading edge and a trailing edge relative to a travel direction; and a furrow closer including a pair of press wheels, said wheels each having an inner side facing toward each other and positioned immediately adjacent to a corresponding said disc outer side, each said wheel also having a leading edge positioned between said corresponding disc leading edge and disc trailing edge, and a trailing edge positioned rearward of said corresponding disc trailing edge relative to the travel direction, each said disc having an axis of rotation, and each said wheel having a leading edge relative to the travel direction, each said wheel leading edge being positioned between a corresponding said axis of rotation and said disc trailing edge.

14. The assembly of claim 13, wherein said discs have an axis of symmetry therebetween.

15. The assembly of claim 14, wherein each said wheel inner side and corresponding disc inner side are positioned at a common acute angle relative to said axis of symmetry.

16. The assembly of claim 13, wherein each of said press wheels are positioned at an acute angle relative to each other, which is substantially parallel with said acute angle associated with said pair of discs.

17. The assembly of claim 13, when said pair of press wheels each have a width by which a pressing force is applied to the soil.

* * * * *